Oct. 30, 1962  F. J. HOFFKNECHT  3,061,266
GATE VALVE FOR IRRIGATION PIPES
Original Filed June 24, 1958
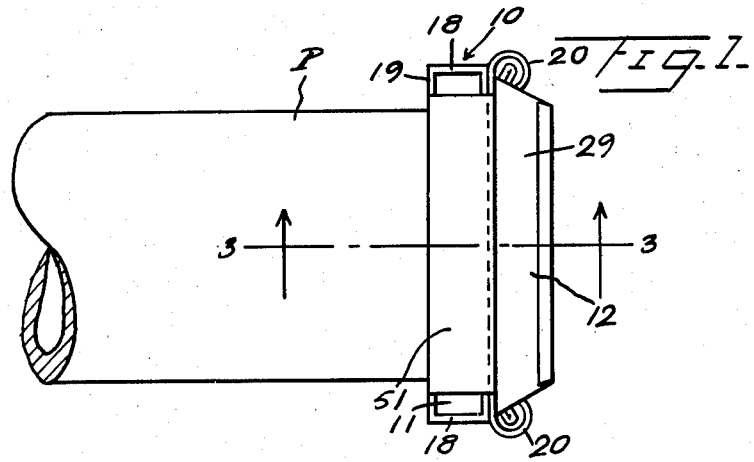
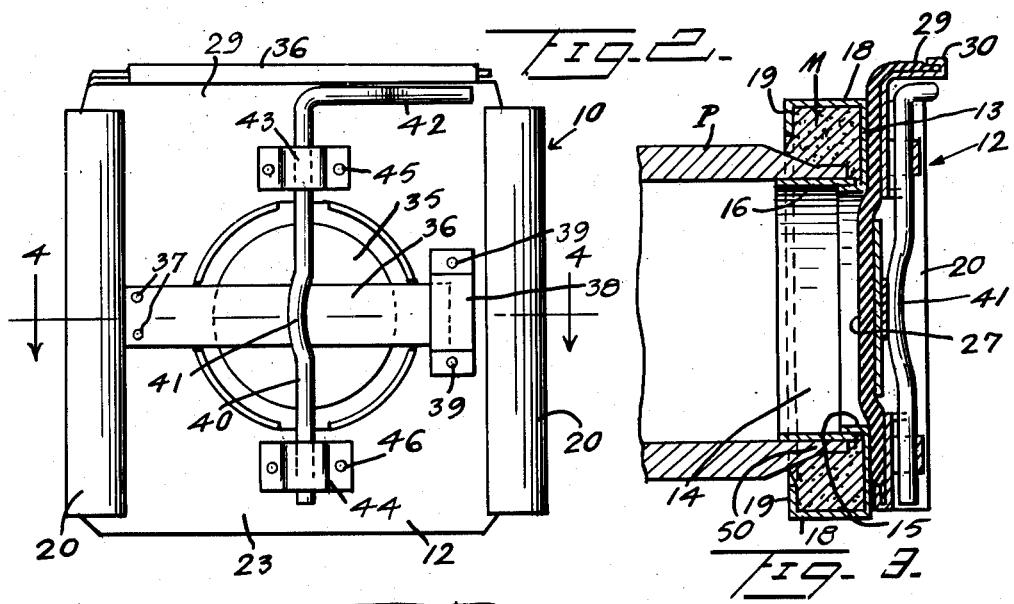
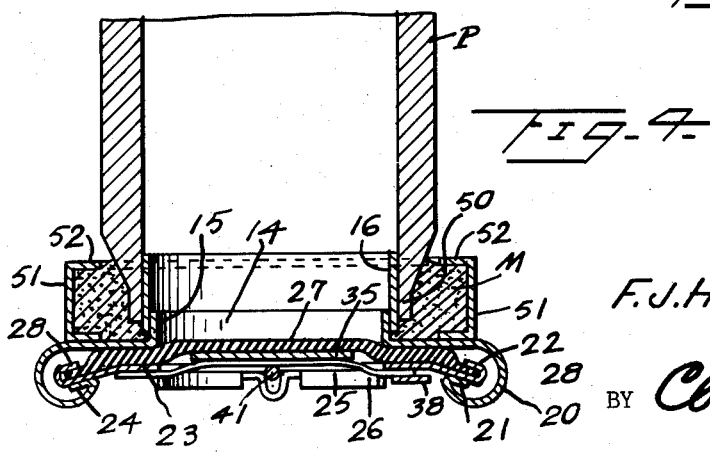
F.J. HOFFKNECHT
INVENTOR
BY *Ca Snow Teo.*
ATTORNEYS.

United States Patent Office 3,061,266
Patented Oct. 30, 1962

3,061,266
GATE VALVE FOR IRRIGATION PIPES
Frank J. Hoffknecht, 3393 Snelling Highway,
Merced, Calif.
Original application June 24, 1958, Ser. No. 744,106, now Patent No. 2,940,723, dated June 14, 1960. Divided and this application Apr. 20, 1960, Ser. No. 23,416
4 Claims. (Cl. 251—147)

This invention relates to a gate valve for irrigation pipes, and comprises a division of my co-pending application Serial No. 744,106, filed June 24, 1958, now Patent No. 2,940,723, June 14, 1960.

A primary object of the invention is the provision of an improved gate and showing a substantially watertight closure when in closed position, but which is readily movable to open position with a minimum of effort and difficulty.

An additional object of the invention resides in the provision of an improved sealing construction including a rubber diaphragm or gasket, and means for securing the same in sealing relation with the end of the pipe.

A further important object of the invention resides in the provision of anchoring flanges associated with the gate per se, and showing a tight mortar filled joint with the gate in the end of the pipe to which it is applied.

Still another object of the invention is the provision of a device of this character which is sturdy and durable in construction, reliable and efficient in operation and relatively simple and inexpensive to manufacture, assemble and install.

Still other objects reside in the combinations of elements, arrangement of parts, and features of construction, all as will be more fully pointed out hereinafter, and disclosed in the accompanying drawing.

In the drawing:

FIGURE 1 is a top plan view of one form gate or gate valve embodying features of the instant invention, as applied to a pipe.

FIG. 2 is an enlarged front elevational view of the gate of FIG. 1.

FIG. 3 is an enlarged sectional view taken substantially along the line 3—3 of FIG. 1 as viewed in the direction indicated by the arrows.

FIG. 4 is an enlarged sectional view taken substantially along the line 4—4 of FIG. 2 as viewed in the direction of the arrows.

Similar reference characters refer to similar parts throughout the several views of the drawing.

Having reference now to the drawing in detail, the valve assembly of the instant invention is generally indicated at 10, and comprises a valve seat member 11 and a valve or gate member 12. The valve seat member 11 includes a substantially rectangular plate portion 13, which is provided with a central circular opening 14, the edges of which are inwardly turned as at 15 to provide flanges, to which is secured a tubular collar 16, in any desired manner as by welding. The upper and lower edges of the plate 13 are outwardly turned as at 18 to provide horizontal flanges 18, the ends of which are inwardly turned to provide vertical flanges 19, the purpose of which will be more fully described hereinafter.

The side edges of the plate 13 are oppositely curled or reverted as indicated at 20, to provide guide tracks for the gate member 12.

The inner edges of the reverted portions 20 are flattened as shown at 21 (see FIG. 4) to provide guide tracks against which rest the obliquely angled side edges 22 of a front plate 23, which comprises the main element of the valve or gate member 12. The plate 23 is provided with a central aperture 25, having an inwardly extending flange 26, the opening being closed by a rubber diaphragm of relatively thick rubber 27, the side edges of which are secured in the inturned ends 28 of the obliquely angled portions 22 and clamped thereby. The top edge of the rubber diaphragm 27 extends forwardly and outwardly over a lip 29 at the top of the gate or valve, which lip serves as a hand grip for raising and lowering the valve to open and close the same, and the edge 30 of the portion 29 is inwardly reverted and clamped over the upper edge of the rubber diaphragm 27.

The rubber diaphragm 27 has affixed to the center thereof a metallic disc 35, for reinforcing purposes, the disc being engaged by a transverse strip 36, one end of which is suitably secured as by spot welding or rivets 37 to one side of the plate 23, while the other end is releasably secured interiorly of a retaining strip 38 which is suitably secured as by means of rivets 39 at the opposite ends to the outer face of the plate 23. A clamping rod 40 is provided which has an offset central portion 41 in alignment with the strip 36, and a right angularly disposed handle portion 42. The rod 40 is held in position by upper and lower bearing strips 43 and 44 which are secured in position as by means of rivets 45 and 46 respectively to the front plate 23.

In the assembly of the device the collar 16 is so dimensioned as to fit snugly within the interior of a conventional irrigating pipe P, which is provided with the customary reduced end portion 50, which seats exteriorly of the collar 16.

The interior formed by the flanges 18 and 19 is solidly packed with mortar M. Suitable flanges 51 are also provided along the sides of the plate 23, as best shown in FIG. 4, and have inwardly, turned extremities 52, the flanges 51 and 52 corresponding in configuration and dimensions to the flanges 18 and 19, and serving a similar purpose along the side edges of the device, mortar being also firmly packed between these flanges and the reduced end 50 of the pipe.

In the use and operation of the device when it is desired to open the valve, the handle 42 of the rod 40 is moved to such a position that pressure is no longer exerted by the offset portion 41 against the strip 36, and consequently the rubber diaphragm 27 and the gate may be opened by raising the lip portion 29.

When the gate is closed, movement of the handle to a position to engage the offset portion 41 against the strip 36 will compress the disc 35, and press the rubber diaphragm 27 partially into the opening 14 to effectively seal the end of the pipe P.

By virtue of the flanges 18, 19 and 51 and 52, and the mortar packing interiorly thereof and around the reduced end 50 of the pipe, a firm and secure and substantially complete watertight seal is provided.

From the foregoing it will now be seen that there is herein provided a device which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What I claim is:

1. In a gate valve construction, an apertured plate having a laterally extended collar fitting within the end of a pipe, a gate member mounted on said plate having a central circular opening, a rubber diaphragm on said plate directly over said circular opening, a metallic disc of a diameter less than said circular opening contacting said rubber diaphragm, and mechanism for effecting movement of said rubber diaphragm inwardly in contact with the wall of said opening, closing said opening.

2. The subject matter as claimed in claim 1, and said diaphragm operating mechanism embodying a clamping rod pivotally mounted on said gate member, said rod having a central offset portion contacting said metallic disc for moving said disc and portion of said diaphragm with which the disc contacts into said aperture, closing said valve.

3. In a gate valve construction, an apertured valve seat plate having a laterally extended collar surrounding said aperture, said collar being secured within one end of a pipe, the opposite side marginal edges of said plate being curved inwardly providing a guide track, a gate member slidable within said guide track, said gate member having a central opening, a plastic, yieldable diaphragm secured on said gate member overlying said opening, a metal disc movable through the opening of said gate member in contact with said diaphragm, forcing said diaphragm through said aperture of said valve seat plate closing said valve, and means for effecting movement of said metal disc.

4. In a gate valve construction, an apertured valve seat plate fitted over one end of a pipe, inwardly curved yieldable flanges formed along the edges of said valve seat plate providing a track, a gate valve member having a central opening, slidable under said flanges of said track, a rubber diaphragm secured to one side of said gate valve member overlying said central opening, a metal disc engaging the central portion of said diaphragm, a transverse strip secured to said gate valve member, resting against said metal disc, a clamping rod having an offset portion engaging said transverse strip, adapted to force said disc and portion of said diaphragm into the aperture of said valve seat plate, closing said valve, and a handle at one end of said clamping rod for effecting movement of said clamping rod.

References Cited in the file of this patent
UNITED STATES PATENTS

| | | |
|---|---|---|
| 1,141,374 | Bowen | June 1, 1915 |
| 2,211,167 | Safford | Aug. 13, 1940 |
| 2,940,474 | Webster | June 1, 1960 |